(12) United States Patent
Van Laarhoven et al.

(10) Patent No.: US 11,306,181 B2
(45) Date of Patent: Apr. 19, 2022

(54) PROCESS FOR PREPARING NYLON SALT AND ITS POLYMERIZATION

(71) Applicant: DSM IP ASSETS B.V., Heerlen (NL)

(72) Inventors: Bas Van Laarhoven, Echt (NL); Eric Grolman, Echt (NL); Michiel Muyris, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 1 day.

(21) Appl. No.: 16/779,364

(22) Filed: Jan. 31, 2020

(65) Prior Publication Data

US 2020/0172673 A1 Jun. 4, 2020

Related U.S. Application Data

(62) Division of application No. 15/329,404, filed as application No. PCT/EP2015/066980 on Jul. 24, 2015, now Pat. No. 10,590,238.

(30) Foreign Application Priority Data

Jul. 29, 2014 (EP) .................................. 14178953

(51) Int. Cl.
*C08G 69/26* (2006.01)
*C08G 69/30* (2006.01)
*C08G 69/28* (2006.01)
*C08J 3/12* (2006.01)

(52) U.S. Cl.
CPC .............. *C08G 69/30* (2013.01); *C08G 69/26* (2013.01); *C08G 69/265* (2013.01); *C08G 69/28* (2013.01); *C08J 3/12* (2013.01)

(58) Field of Classification Search
CPC ......... C08L 77/06; C08G 69/26; C08G 69/06; C08G 69/28; C08G 63/78
See application file for complete search history.

(56) References Cited

U.S. PATENT DOCUMENTS

| 4,019,866 A | 4/1977 | Jaswal et al. |
| 4,246,395 A | 1/1981 | Mortimer |
| 4,603,193 A | 7/1986 | Richardson et al. |
| 4,627,940 A * | 12/1986 | Beaver .................. C08G 69/28 528/335 |
| 2013/0172521 A1 | 7/2013 | Nakai |

FOREIGN PATENT DOCUMENTS

| EP | 0 123 377 | 10/1984 |
| GB | 1526329 | 9/1978 |
| WO | 99/10408 | 3/1999 |
| WO | 2013/014236 | 1/2013 |
| WO | 2013/085747 | 6/2013 |
| WO | 2013/107425 | 7/2013 |

OTHER PUBLICATIONS

International Search Report for PCT/EP2015/066980, dated Aug. 25, 2015, 4 pages.
Technische Thermoplaste, Polymer Handbook ¾ Polyamide (1998), pp. 805-806.
Papasyprides et al; Polymer 47 (2006) 1020-1027.

* cited by examiner

*Primary Examiner* — Gregory Listvoyb
(74) *Attorney, Agent, or Firm* — Nixon & Vanderhye P.C.

(57) ABSTRACT

The present invention relates to a process for preparing a granular nylon salt material, wherein an aqueous mixture, comprising at least 65 wt. % of salt components, and at most 35 wt. % of an aqueous medium, the weight percentages (wt. %) being relative to the total weight of the aqueous mixture, is flashed from a pressure vessel via a flash valve into a flash chamber, thereby evaporating the aqueous medium in an amount sufficient to result in a residual moisture content of at most 7.5 wt. %, and forming a granular nylon salt material. The invention also relates to a process for preparing a nylon polymer, comprising direct solid state polymerization of the granular salt material prepared by flash granulation.

18 Claims, No Drawings

PROCESS FOR PREPARING NYLON SALT AND ITS POLYMERIZATION

CROSS-REFERENCE TO RELATED APPLICATIONS

This application is a divisional of commonly owned U.S. Ser. No. 15/329,404, filed 26 Jan. 2017 (now U.S. Pat. No. 10,590,238), which is the U.S. national phase of International Application No. PCT/EP2015/066980 filed 24 Jul. 2015, which designated the U.S. and claims priority to EP Patent Application No. 14178953.7 filed 29 Jul. 2014, the entire contents of each of which are hereby incorporated by reference.

FIELD

The present invention relates to a process for preparing a nylon salt. The present invention also relates to a process for preparing a polyamide by polymerization of a nylon salt.

BACKGROUND AND SUMMARY

A nylon salt is herein understood to be a diammonium dicarboxylate salt, also indicated as a diamine/dicarboxylic acid salt, in other words a salt prepared from a diamine, or a mixture of diamines, and a dicarboxylic acid or a mixture of dicarboxylic acids. Polyamides prepared from such salts are generally indicated as AA-BB polyamides. Herein an AA-BB polyamide is understood to be a polyamide comprising alternating AA and BB repeating units, wherein AA represents the repeating units derived from diamine and BB represents the repeating units derived from dicarboxylic acid. Throughout this text the wordings "diammonium dicarboxylate salt" and "nylon salt" are meant to have the same meaning and are therefore interchangeable.

For the preparation of polyam ides from nylon salts, different processes are known. The known processes include melt processes, solution processes and solid state processes. Known solid state processes include processes comprising solid state post condensation of polyamide prepolymer obtained by melt polymerization, solution polymerization followed by flashing and solid state post condensation and direct solid state polymerization processes. In such a process, the salt used is generally a granular material, such a powder, and the aim is also to obtain the resulting polymer as a granular material. The salt material used herein can be a salt powder or granular material obtained, for example, by spray drying, precipitation from solution, or a dry route process involving reaction of liquid diamine with solid dicarboxylic acid. The salt may also have a particular shape of compacted powder particles. Such a process is described, for example, in the patents U.S. Pat. No. 5,128,442 and GB-801,733.

In a melt process, a diamine, or a mixture of diamines, and a dicarboxylic acid or a mixture of dicarboxylic acids are mixed wherein at least one of the diamine or the dicarboxylic acid is in a melt form and the mixture of the two is obtained in a form of a melt. The resulting melt can be further polymerized to obtain a polyamide polymer.

Not all nylon salts are suited to be prepared in the melt, or even to be polymerized in the melt. In particular polyamides with high melting temperatures, such semi-crystalline semi-aromatic polyamides, tend to give side reactions when prepared in the melt.

In a solution process the diamine(s) and dicarboxylic acid(s) are first dissolved in a solvent. The solvent suitably consists of water or comprises a mixture of water and an organic co-solvent. The salt may be either isolated from the solution, and then polymerized by means of a suitable polymerization process, or first converted in the solution into a prepolymer and then isolated from the solution, and further polymerized by solid-state post condensation, or be converted into a prepolymer in the solution and then concentrated by evaporation of water and further polymerized in the melt.

Salts isolated from solution may be used for polymerization into polyamides. Known methods for the polymerization of isolated salts include melt polymerization, optionally followed by solid-state post condensation, and direct solid state polymerization.

For the isolation from solution different processes are known, including spray drying, crystallization induced by cooling followed by precipitation, precipitation induced by adding an organic non-solvent, or induced by evaporation of water and any co-solvent present.

Typically, the organic co-solvent as well as the organic non-solvent has to be miscible with water. An organic co-solvent and an organic non-solvent are herein understood to be different organic solvents, which differ by the fact that the nylon salt is soluble in the co-solvent, or in the mixture of water and co-solvent, whereas the nylon salt is not soluble in the non-solvent, or the mixture of the non-solvent and water.

Isolation by crystallization is an inherently slow process due to slow crystal growth rates, and is characterized by a very complex set-up of unit operations. Furthermore, co-crystallization of mixed salts, i.e. salts prepared from a mixture of diamines and a mixture of dicarboxylic acids is a challenge in itself.

Precipitation with an organic non-solvent has the disadvantage that relative large amounts of the organic non-solvent have to be used and that this non-solvent has to be recovered from water, resulting in large waste streams and a complex process as well.

Precipitation induced by evaporation of water and any co-solvent present can result in formation of big lumps, which can lead to difficulties in full removal of the solvent at the end of the process, and to problems with discharging the salt from the reactor, while big lumps need grinding and classification for further use in further processes.

Spray drying involves atomization of a solution and drying of small droplets in a counter-current flow of heated inert gas. The process typically results in a powder with relative small particles, and use of inert gas is essential to avoid the explosion risk which such particles pose in air. For the inert gas generally nitrogen gas is used. Spray drying is typically done in an apparatus comprising a very tall annular channel, or drying tower, equipped with multiple high pressure nozzles at the top of the channel, an inert gas stream, and a cyclone for separation of the fines from the inert gas stream. In a spray drying process, atomization of the solution into small droplets is critical, and also the droplet size needs careful control in order to obtain a dry powder at the bottom of the drying channel. For that purpose, nozzles with small dimensions and solutions with low viscosity have to be used. The solutions must be clear and free of impurities. The solutions must also be relatively highly diluted to relatively low concentrations, well below the saturation level of the salt, to prevent premature crystallization of the salt in the nozzles and to prevent blockage of the nozzles resulting from such premature crystallization. Due to the requirement of diluted solutions, large amounts of water need to be evaporated. This becomes even worse with nylon salts for semi-aromatic polyamides, which generally have a much lower solubility than salts for aliphatic polyamides. Almost all of the energy input needed for the evaporation has to come from the heated inert gas. This requires large volumes of heated gas to be circulated and heating with hot gas is inefficient and costly. Moreover, drying by heated inert gas requires large volume reactors and involves a complex process stream, since the inert gas needs filtering, heating, compressing and recycling, Solution processes where nylon salts for semi-aromatic polyamides are prepared, comprising at least an aromatic diamine or an aromatic dicarboxylic acid, have the general disadvantage that the solubility of the salt is limited, and a large volume of water, or a mixture thereof with another solvent is needed.

Nylon salts can also be prepared in solid state under dry conditions, i.e. without the use of a solvent or a melt, by dosing liquid diamine to a solid powder of dicarboxylic acid under conditions that the dicarboxylic acid and the salt resulting thereof always remain below the melting temperature of the dicarboxylic acid and of the salt. A problem is that such a process is difficult to be carried out at large scale while applying conditions that the reactor content retains in a powdery state.

Therefore, in view of the above, there is need for a process for preparing a nylon salt that does not have the above disadvantages, or at least so in less extent, and in particular for a process suitable for preparing a semi-aromatic nylon salt in an effective and efficient manner.

The aim of the present invention is to provide a process for preparing a nylon salt in an effective and efficient manner.

This aim has been achieved with the process according to the invention, as mentioned in claim 1.

The process according to the invention is a flash process, wherein a hot, pressurized and concentrated aqueous mixture comprising a nylon salt dissolved or dispersed in an aqueous medium, is flashed at elevated temperature, upon which water is evaporated and a granular material is obtained.

DETAILED DESCRIPTION

The effect of the process according to the invention, comprising flashing of an aqueous salt mixture at elevated temperature, is that a solid salt in the form of a granular material is obtained in an effective and efficient manner. With the process the granular nylon salt material is obtained in a much faster and simpler manner than crystallization or spray drying. Less water is needed, also because a slurry can be used, and no controlled droplet size atomization is required. The aqueous mixture can be flashed by a flash valve having a relatively large opening, without the need of spray nozzles with a small opening, which significantly reduces the risk of blocking of the opening and also allows the use of slurries, which have a salt content well above the solubility level. Because of the high temperature and the relatively low water content, the water is evaporated adiabatically, or at least essentially so, without the need for applying a large countercurrent of heated inert gas. This results in a fast and efficient drying step and allows discharging of the aqueous mixture from a pressure reactor in a relatively short time, much shorter compared to spray drying. No hot gas processing is needed, other than water vapor resulting from evaporation of the water from the flashed hot aqueous mixture, and no large volumes of inert gas have to be heated and processed. In order to reduce explosion risks, it is sufficient to fill the flash chamber with inert gas. Any traces of oxygen still present, will be expelled with the water vapor. Because of the use of a concentrated aqueous mixture, relatively small reactors can be used. Overall, reactor design and unit operations can be simplified and second stream processing can be simplified to removal of hot steam and condensation of water vapor. Surprisingly, even the lower solubility of semi-aromatic nylon salts is not a bottleneck to flash with sufficiently low amount of water to achieve an essentially non-sticking powder. Also surprisingly a very good pelletizable product, with a relatively high bulk density, is obtained.

The process according to the invention comprises steps of:

a) providing in a pressure vessel a concentrated aqueous mixture comprising at least 65 wt. % of salt components and at most 35 wt. % of the aqueous medium, the weight percentages (wt. %) being relative to the total weight of the of the aqueous mixture;

b) controlling the concentrated aqueous mixture in the pressure vessel to have a temperature Tp of at least 150° C., thereby providing a pressurized aqueous mixture;

c) controlling pre-condensation eventually occurring in the concentrated aqueous mixture to remain at a level of at most 15 mole %;

d) discharging the pressure vessel by flashing the concentrated aqueous mixture via a flash valve into a flash chamber, thereby evaporating the aqueous medium in an amount sufficient to result in a residual moisture content of at most 7.5 wt. %, and forming a granular nylon salt material, wherein the wt. % is relative to the weight of the granular nylon salt material.

The process according to the invention involves the use of an aqueous mixture, which can be either an aqueous solution or an aqueous slurry. The aqueous mixture is a concentrated aqueous mixture in that it comprises at least 65 wt. % of salt precursors, in case of a solution, or salt components, in case of a slurry, and at most 35 wt. % of the aqueous medium. Herein the weight percentages (wt. %) are relative to the total weight of the of the aqueous mixture.

The concentrated aqueous mixture used herein suitably is either:

i. an aqueous solution comprising at least 65 wt. % of salt precursors and at most 35 wt. % of the aqueous medium; or ii. an aqueous slurry comprising a total amount at least 65 wt. % of salt components and at most 35 wt. % of the aqueous medium.

The weight percentages (wt. %) being relative to the total weight of the of the aqueous mixture.

Salt precursors are herein understood to be the monomers from which the nylon salt is prepared, which monomers comprise a diamine, or a mixture of at least two diamines, and a dicarboxylic acid, or a mixture of at least dicarboxylic acids dissolved in the aqueous medium.

Salt components are herein understood to be the total of monomers from which the nylon salt is prepared, and nylon salt resulting from the monomers. The slurry will comprise the nylon salt being dispersed in the aqueous medium slurry, and a remainder of monomers being dissolved in the aqueous medium.

It is noted that the diamine used in the process for preparing the nylon salt can be a single diamine, or a mixture of different diamines. Unless specifically noted otherwise, the single form 'diamine' has the meaning of including both a single diamine and a mixture of different diamines. Analogously, the dicarboxylic acid used in the process for preparing the nylon salt can be a single dicarboxylic acid, or a mixture of different dicarboxylic acids. Unless specifically noted otherwise, the single form 'dicarboxylic acid' has the meaning of including both a single dicarboxylic acid and a mixture of different dicarboxylic acids.

The expression "in the range of X-Y", wherein X and Y represent lower and upper limits, has the meaning that the range is from X up to and including Y. In other words, in said expression the values of both limits are included in the range.

With a granular material is herein understood a material consisting for at least 50 wt. % of particles with a particle size of at most 3 mm (millimeter). Such a material has a d50 of 3 mm or less. Herein the amount of particles with a particle size of at most 3 mm is determined by sieving and weighing. The particle size for the d50 value, respectively the wt. % of particles with a particle size of at most 3 mm is determined by the method according to DIN 66-165 part 1 and 2.

The aqueous medium comprised by the slurry or solution used in the inventive process comprises at least water. It may suitably comprise a co-solvent, such as an organic solvent. Preferably the co-solvent is a liquid that is miscible with water. Suitably the liquid miscible with water is an alcohol. Examples thereof include methanol and ethanol. Such liquids miscible with water may be used for example to increase the solubility of the salt in water. The liquid miscible with water may also be used otherwise, for example to partially precipitate the salt from an aqueous solution, thereby forming a slurry. Suitably, the co-solvent is present in an amount of 0-50 wt. %, and more particular 0-25 wt. %, relative to the total weight of water and co-solvent.

In a preferred embodiment, the aqueous medium consists of water. This has the advantage that no special precautions have to be taken for removal, separation or recycling of any co-solvent. Furthermore, the use of water is generally sufficient since water appears to be a very good solvent also for semi-aromatic salts at elevated temperature, and because also a slurry can be used for the concentrated aqueous mixture, there is no need for complete dissolution at the high concentration applied.

By controlling the concentrated aqueous mixture in the pressure vessel to have a temperature Tp of at least 150° C., the concentrated aqueous mixture is also pressurized, thereby providing a pressurized concentrated aqueous mixture.

For preparing the pressurized concentrated solution different routes can be applied. Two possible routes will be exemplified here.

Suitably, the aqueous solution is prepared by:
providing a slurry comprising salt components dispersed in an aqueous medium in a pressure vessel; and
closing the pressure vessel and heating the slurry in the pressure vessel to elevated temperature thereby increasing the pressure in the pressure vessel, dissolving the salt components and obtaining a clear solution.

The slurry may be provided in the pressure vessel, either by preparing the slurry inside the pressure vessel, or by preparing the slurry outside the pressure vessel and then charging the slurry into the pressure vessel. After a clear solution is obtained, if so needed or selected, the solution can be further concentrated to a higher concentration, by evaporating a part of the aqueous medium, or heated to higher temperature and brought to a higher pressure, or both. Herein evaporating and heating might be done simultaneously or sequentially, in any combination of the two.

As an alternative, the aqueous solution may be prepared by
dissolving salt precursors in an aqueous medium, using an excess of the aqueous medium, thereby obtaining a clear solution; and
evaporating the excess of the aqueous medium at elevated temperature and elevated pressure, thereby obtaining a pressurized concentrated solution.

Herein the aqueous medium in which the salt precursors are dissolved in the first step, is used in an amount larger than needed for the concentrated solution, thus comprising an excess, which is removed by evaporation in the second step.

Herein the elevated temperature is above 100° C., suitably between 100° C. and 170° C., and the elevated pressure is above atmospheric pressure, and will depend on the temperature and amount of aqueous medium present at the different stages in this procedure. This procedure requires a relative large amount of the aqueous medium, more than in the procedure above, but avoids difficulties in handling and heating a slurry and determining when the solution become completely clear.

The pressure vessel in which the concentrated aqueous solution is prepared might be the same as the pressure vessel from which the pressurized aqueous mixture is prepared, or it might be a different one, from which the concentrated aqueous solution is than charged into the other one.

The process for preparing the pressurized concentrated aqueous solution is suitably carried out as follows:
mixing salt precursors with an aqueous medium in a weight ratio salt precursors/aqueous medium of at least 10/90, preferably at least 25/75, more preferably at least 50/50;
concentrating and evaporating to a weight ratio of at least 65/35 and at a temperature between 100° C. and 150° C., thereby at least partially or fully dissolving the salt precursors in the aqueous medium and forming a preliminary aqueous solution or slurry having a temperature between 100° C. and 150° C.; and
heating the preliminary aqueous solution or slurry in a closed vessel under pressure to a temperature Tp of at least 150° C. and below 230° C., and sufficiently high to completely dissolve the salt precursors in the aqueous medium, thereby resulting in pressurized concentrated aqueous solution.

The slurry that can be used in the flash step in the salt preparation process according to the invention may be prepared by any suitable process wherein a concentrated aqueous slurry comprising nylon salt particles dispersed in the aqueous medium is obtained. Preferably the slurry directly obtained from an aqueous solution comprising a diamine and a dicarboxylic acid dissolved in the aqueous medium. This can be accomplished by the procedure, wherein the concentrated aqueous slurry is prepared by
i) preparing an aqueous solution by dissolving salt precursors in an aqueous medium; and
ii) concentrating the aqueous solution by evaporating the aqueous medium in an amount sufficient to result in partial precipitation of the diammonium/dicarboxylate salt, thereby obtaining the concentrated aqueous slurry comprising salt particles dispersed in the aqueous medium.

For the preparation of the aqueous solution herein, suitably one of the two procedures described above is used. The advantage of preparing the slurry in this manner is that the amount of residual dicarboxylic acid in the granular salt material, if any, is low. With residual dicarboxylic acid is herein understood dicarboxylic acid that has not been neutralized by diamine in a salt formation reaction. This means that first the diamine and the dicarboxylic acid have to be completely dissolved in the aqueous medium, for example at elevated temperature, and then the slurry is formed, for example by partial evaporation of the aqueous solution and thereby concentrating the solution. By concentrating the solution, first the saturation level for the dissolved salt will be reached and upon further concentration going beyond the saturation level, crystallization of the salt will occur, and formation of a slurry will occur.

The aqueous solution or aqueous slurry as used in the process according to the invention has a salt concentration of at least 65 wt. %. The concentration may well be as high as 95 wt. %, or even above, provided that the aqueous mixture remains in a liquid state and can still be flashed. A low concentration has the advantage that it easier to obtain a clear solution. A high concentration has the advantage that a flashed product with a lower residual moisture content is obtained. Preferably, the salt concentration is in the range of 70-90 wt. %, still more preferably 75-85 wt. %. Herein the salt concentration is calculated as the weight percentage (wt. %) of total amount of diamine and dicarboxylic acid, relative to the total weight of the solution or slurry. For clarity: where in the process a mixture of diamines and/or a mixture of dicarboxylic acid is used, for the calculation of the total amount of diamine and dicarboxylic acid, all the diamines in the mixture and all the dicarboxylic acids in the mixture have to be included.

The solution or slurry may comprise, next to the nylon salt, respectively the constituting diamine(s) and dicarboxylic acid(s), one or more other components. In view of the high salt concentration, the amount of such other component or components shall be limited. Furthermore, such other component(s) should not inhibit the formation of solid salt particles in the flash process. Suitably, such other components, if present at all, are selected from components that are useful during the polymerization, or are useful in the polyamide composition to be prepared. Examples of such components are stabilizers, polymerization catalysts and inert additives, for example inorganic pigments. Suitably, the concentrated aqueous mixture comprises at most 10 wt. %, more preferably at most 5 wt. %, of at least one other component, wherein the weight percentage (wt. %) is relative to the total weight of the aqueous solution or slurry.

During heating of the aqueous mixture to elevated temperature and during the step of controlling the aqueous mixture in the pressure vessel to have a temperature above 150° C., thereby obtaining a pressurized aqueous mixture, and optionally while maintaining the pressurized aqueous mixture for a longer time at elevated temperature prior to discharging of the pressurized aqueous mixture from the pressure vessel by flashing into the flash chamber, eventually less or more pre-condensation may occur. Pre-condensation is herein understood to be the formation of amide groups due to reaction of a part of the amine groups and a part of the acid groups in the diamine and the dicarboxylic acid. The level of precondensation that has occurred, herein also referred to as pre-condensation level, is herein calculated as the total molar amount of reacted amine groups and carboxylic acid groups relative to the total molar amount of amine and carboxylic acid groups in the diamine and dicarboxylic acid monomers used in the preparation of the diammonium dicarboxylate salt.

The pre-condensation level is herein determined by $^1$H-NMR measurements on the salt product; the relative amount X of reacted amine groups and carboxylic acid groups is determined by integration of the NMR signal for of $\alpha$-(C)H hydrogen atoms in amide groups; the relative amount Y of non-reacted amine groups and carboxylic acid groups is determined by integration of the signal $\alpha$-(C)H atoms in the diamine and the dicarboxylic acid. The pre-condensation level is then calculated as the percentage of X relative to (X+Y).

With an $\alpha$-(C)H hydrogen atom is herein understood a hydrogen atom bonded to a carbon atom in $\alpha$-position relative to respectively an amide group, an amine group or a carboxylic acid group. The $\alpha$-(C)H atoms in amide groups, i.e. the carbon bonded hydrogen atom in the group —C(H)—NH—CO— and the carbon bonded hydrogen atom in the group —NH—CO—C(H)—, have a different chemical shift in $^1$H-NMR than carbon bonded hydrogen atom in the group —C(H)—NH$_2$ and in the group —C(H)—COOH. In salts, based on mixtures of monomers comprising monomers not comprising an $\alpha$-(C)H atom, the calculation is based on the $^1$H-NMR signals from the monomers comprising an $\alpha$-(C)H atom. For example, in salts for semi-aromatic polyamides based on aliphatic diamines and an aromatic dicarboxylic acid, the aromatic dicarboxylic acid does not comprise a $\alpha$-(C)H atom. Herein the amount of non-reacted aliphatic diamine will be representative for the amount of non-reacted aromatic dicarboxylic acid, while the amount of reacted aliphatic diamine will be representative for the amount of reacted aromatic dicarboxylic acid, and thus the determination and calculation as indicated above is directly representative for the level of pre-condensation occurred.

It is noted that a flash process, similar to which is used in the present invention for preparing a nylon salt, is known in the art for preparing polyamide prepolymers. However, to obtain the prepolymers in the form of a powder, and not as a sticky mass, the prepolymer must have a number average molecular weight of generally at least 1000, more particular at least 1500. This corresponds with a degree of condensation of at least 80%, more particular at least 90%. This is in particular the case with semi-aromatic polyamides with mixed diamines and/or mixed diacids. With aliphatic polyamides the prepolymers might have a somewhat lower number average weight e.g. at least 500, and a somewhat lower degree of condensation, e.g. 70%, while still obtaining a product in powder form. Going further down in level of condensation, generally a very sticky or even a slimy or snotty product is obtained.

It has been observed in the present invention, that by keeping the pre-condensation level much lower, a salt in a granular form is obtained. The salt may contain some pre-condensed components, which are assumed to have the composition of a binary product comprising a diamine and a dicarboxylic acid each with one reacted group, and with one remaining amine group and one remaining carboxylic acid group.

The process according to the invention requires controlling pre-condensation eventually occurring in the concentrated aqueous mixture to remain at a level of at most 15 mole %. This is in order to obtain the salt as a granular material.

Preferably, the pre-condensation level is at most 10%, more preferably at most 7%. A lower pre-condensation level has the advantage that the risk of caking of the salt upon storage is lower.

The occurrence of pre-condensation can be observed in the flash process by monitoring the pressure in the pressure vessel. Due to the pre-condensation reaction, water is released. Due to the so-formed reaction water, which will add to the water already present in the aqueous mixture, the pressure will increase above the level which would be normal for the amount of water already present in the aqueous mixture in combination with the temperature applied. The pressure may furthermore go up, as a result of a decrease in boiling point of the aqueous mixture due to the fact that the concentration of the salt ions in the aqueous mixture is decreasing by reacting to pre-polymer. In particular when a highly concentrated aqueous mixture is used, comprising a relative large amount of salt components and a very low amount of water the increase in pressure is visible already at a low level of pre-condensation and can be significant at a high level of pre-condensation.

With controlling the pre-condensation level is meant herein that measures are taken by which the pre-condensation level stays below an indicated level. Controlling the pre-condensation to stay below a low level is accomplished by applying a limited Tp and a limited residence time $t_R$ at elevated temperature. When the pre-condensation in the resulting salt appears to be too high, either Tp has to be lowered or $t_R$ to be shortened, or both. Typically, either Tp is much lower than the temperature applied in the prepolymer-flash process mentioned above or $t_R$ is much shorter than the residence time applied in the said prepolymer flash process. The best results are obtained by applying both a lower Tp and a lower residence time at elevated temperature.

Preferably, the temperature Tp of the pressurized aqueous mixture in the reaction vessel, is kept below 230° C. A Tp in the range between 210° C. and 230° C. is suitably applied for salts based on aromatic dicarboxylic acids, while keeping the residence time rather short. Using such a high temperature has the advantage that either a salt with a lower residual water content is obtained, or that an aqueous mixture with a higher amount of the aqueous medium can be used.

For salts based on an aromatic dicarboxylic acid, using a temperature profile with a Tp of 230° C., the residence time is suitably kept at about or better below 15 minutes, even better below 10 minutes. With a Tp of 220° C., the residence time is suitably kept at about or better below 30 minutes, even better below 20 minutes, while with a Tp of 210° C. the residence time is suitably kept at about or better below 90 minutes, even better below 60 minutes.

During the process the temperature Tp is preferably kept in the range of 150-210° C., more preferably in the range of 160-200° C. A lower maximum temperature has the advantage that a longer residence time can be applied, allowing longer time for preparing the heated and pressured aqueous mixture in the pressure vessel, and/or for discharging the pressure vessel, and a higher temperature has the advantage that a product with a lower moisture content is obtained or a higher amount of the aqueous medium in the aqueous mixture can be used.

For salts based on monomers comprising aliphatic dicarboxylic acids, such a high Tp of above 200° C. may be applied but would require an extremely short residence time $t_R$ to prevent pre-condensation to occur in significant extent. For the preparation of aliphatic salts, or for mixed salts comprising both aliphatic dicarboxylic acid and aromatic dicarboxylic acid, the temperature Tp is suitably even much lower and preferably kept in the range of 150-180° C., or better 155-175° C. and for pure aliphatic salts even more preferably in the range of 160-175° C.

The lower temperature as preferred for the aliphatic salts implies that the amount of aqueous medium in the aqueous mixture has to be further limited to allow for obtaining a granular nylon salt material with a sufficient low moisture content.

Preferably, the amount of the aqueous medium is at most 30 wt. %, more preferably at most 25 wt. %. Correspondingly, the amount of salt components is preferably at least 70 wt. %, more preferably at least 75 wt. %.

For the aliphatic salts, the use of a Tp in the lower ranges in combination with a lower amount of aqueous medium still allows the use of an aqueous solution for the aqueous mixture, because of the higher solubility of aliphatic salts compared to their aromatic counterparts. Aliphatic salts, in particular those with shorter chain diamines, tend to crystallize in a crystal form including one or two molecules of water per salt unit. Preparation of a slurry with a high salt content would create the risk of solidification of the concentrated mixture. This risk is reduced by using a higher amount of aqueous medium, and avoided by using a solution. Preferably, for the aliphatic salts, the aqueous mixture is an aqueous solution, rather than an aqueous slurry. Also the amount of the aqueous medium is preferably at least 10 wt. %, more preferably at least 15 wt. %. Correspondingly, the amount of salt components is preferably at most 90 wt. %, more preferably at most 85 wt. %.

An amount of aqueous medium of at most 30 wt. %, more particular at most 25 wt. %, is also advantageously applied for the nylon salts based on aromatic dicarboxylic acids flashed at higher temperature, since this results in a granular nylon salt material having a lower residual moisture content. Using a lower amount of aqueous medium may result in the formation of a slurry due to the lower solubility of such salts, but this is less critical. Also here the amount of the aqueous medium is suitably at least 10 wt. %, more particular at least 15 wt. %. This is advantageous for obtaining a slurry with a lower viscosity.

The process according to the invention requires controlling the concentrated aqueous mixture in the pressure vessel to have a temperature Tp of at least 150° C. By doing this in the pressure vessel the aqueous mixture becomes pressurized. With controlling the concentrated aqueous mixture to have said temperature Tp of at least 150° C., is meant herein that measures are taken by which the aqueous mixture retains such a temperature of at least 150° C., or by which the aqueous mixture attains such a temperature. For example, in case the concentrated aqueous mixture is prepared outside the pressure vessel and charged under pressure into the pressure vessel while already having a temperature of at least 150° C., the measures may exist in keeping the temperature Tp of at least 150° C. Also when the aqueous mixture is prepared inside the pressure vessel at a temperature of at least 150° C. under pressure, the measures may exist in keeping the temperature Tp at at least 150° C. The measures may also exist in first heating the aqueous mixture in the pressure vessel to a temperature of at least 150° C., and then retaining the temperature at least at 150° C. while keeping the pressure vessel closed. These measures may suitably be applied when the concentrated aqueous mixture is first prepared outside the pressure vessel and charged to the pressure vessel at a temperature below 150° C., or when the aqueous mixture is prepared inside the pressure, and having a temperature below 150° C., before being heated to at least 150° C.

In the process according to the invention a pressurized and concentrated aqueous mixture having a temperature of at least 150° C. is flashed from a pressure vessel into a flash chamber thereby providing a granular nylon salt material. The process has to be carried out such that the aqueous medium is evaporated in the flash step (step d) in an amount sufficient to result in a residual moisture content of at most 7.5 wt. % in the granular nylon salt material, wherein the wt. % of residual moisture content is relative to the weight of the granular nylon salt material. This requirement can be accomplished by selecting the appropriate amount of aqueous medium in combination with the temperature Tp applied for pressurized aqueous solution. As an indication, the aqueous medium is suitably present in an amount, depending as follows on Tp:

of at most 20 wt. %, while Tp is in the range from 150° C. to 170° C.; or
of at most 25 wt. %, while Tp is in the range from 170° C. to 190° C.; or
of at most 30 wt. %, while Tp is in the range from 190° C. to 210° C.; or
of at most 35 wt. %, while Tp is in the range from 210° C. to 230° C.

In a preferred embodiment of the process according to the invention, wherein the nylon salt is an aliphatic salt, i.e. the salt components therein being all aliphatic components, comprising an aliphatic diamine, or a mixture of at least two aliphatic diamines, and an aliphatic dicarboxylic acid, or a mixture of at least two aliphatic dicarboxylic acids, the aqueous medium is present in an amount of at most 20 wt. %, relative to the total weight of the aqueous mixture, and the temperature Tp is in the range from 150° C. to 170° C.

To be able to flash the aqueous mixture from the pressure vessel into the flash chamber in a sufficiently short time, it is advantageous to have a minimum pressure difference between the pressure vessel and the flash chamber. Preferably, the pressure difference ΔP between the pressure vessel and the flash chamber is at least 2 bar, more preferably at least 5 bar. Using a higher water content, for example 15 wt. % or more, in combination with at higher temperature, such as 170° C. or more, the pressure in the pressure vessel will be at least 5 barg, or 6 bara. With an atmospheric pressure (1 bara) in the flash chamber, the difference ΔP will then also be at least 5 bar. To attain a difference ΔP at a temperature below 160° C., the pressure in the pressure vessel may be raised by applying pressure with nitrogen gas or overheated steam.

The process according to the invention is suitably carried out in an apparatus comprising a pressure vessel equipped with a flash valve, and a flash chamber. The flash valve is herein positioned between the pressure vessel and the flash chamber, thus allowing by opening of the flash valve for discharging of the aqueous mixture from the pressure vessel into the flash chamber. The forming of granular salt material by the flash process according to the invention is supposed to proceed as follows: the salt solution or salt slurry is flashed into a flash chamber. Upon flashing, the pressure is released, droplets are formed and the aqueous medium evaporates adiabatically or essentially so, which occurs very fast, upon which the salt solidifies and the nylon salt particles are formed. The evaporated water is removed as steam, while the nylon salt particles settle down, thereby obtaining the granular salt material.

The process according to the invention may be carried out, for example, batch wise or in a continuous manner. On small scale the process is conveniently carried out in a batch autoclave, whereas on industrial scale a continuous evaporator, discharging to a continuously operated flash nozzle and flash chamber, may be more convenient. Continuous operation has the additional advantages of allowing shorter residence times of the salt solution at elevated temperatures and reduced size of equipment for a given production capacity. Design guides for continuous evaporators, such as thin film evaporators can readily be found in standard text books, such as Perry's Chemical Engineers' Handbook $7^{th}$ edition section 11-13.

In the flash step, the aqueous medium is suitably evaporated in an amount, sufficient to result therein that the granular salt material has a residual moisture content of at most 7.5 wt. %. Preferably, the residual moisture content is at most 5.0 wt. %, more preferably at most 4.0 wt. %, still more preferably at most 2.0 wt. %. Herein the weight percentage (wt. %) is relative to the total weight of the granular salt material including the residual moisture. The advantage of a lower water content is reduced risk of caking upon storage. With moisture is herein understood water, and where applicable any co-solvent, retained in the granular salt material obtained after the flash process. The residual moisture content is measured by determining the weight loss of the granular salt material upon drying of the salt during 24 hours at 105° C. and under a vacuum of 100 mmHg. The residual moisture content is calculated from the weight loss expressed as weight percentage relative to the weight of the granular salt material before drying.

The flash chamber comprised by the apparatus in which the flash process is carried out, is suitably operated at a pressure, which allows the aqueous medium to be evaporated adiabatically, or essentially so, upon flashing form the pressure vessel. The pressure in the flash chamber can, most practically, be chosen to be equal to atmospheric pressure. The pressure in the flash chamber may also be above, or below atmospheric pressure, as long as the pressure difference with the pressure in the pressure vessel is sufficient to allow for adiabatic evaporation, or essentially so, of the aqueous medium from the flashed aqueous mixture. Advantageously, the pressure in the flash chamber is below atmospheric pressure. This will enhance the evaporation and result in a drier salt product.

The flash chamber, or at least the side wall thereof, may be heated to avoid condensation of vaporized water into liquid water flowing down from the wall, and thereby to avoid condensed water to get into contact with the granular salt product.

In the process according to the invention, in principle any nylon salt can be prepared provided that the salt can be dissolved in an aqueous medium and an aqueous solution of the constituting diamine(s) and the dicarboxylic acid(s) can be prepared. Forming of a granular salt material is generally no issue since dry or substantially dry nylon salts are typically solid materials at room temperature.

The salt suitably is a salt of a single diamine and a single dicarboxylic acid. The salt may also be a mixed salt, made from multiple components. The mixed salt is suitably made of components comprising at least two diamines and one dicarboxylic acid, or one diamine and at least two dicarboxylic acids, or even at least two diamines and at least two dicarboxylic acids. The mixed salt may eventually comprise three or more diamines and or three or more dicarboxylic acids.

Suitably, the diamine used for the salt in the process according to the invention is selected from aliphatic diamines, or aromatic diamines, or any combination thereof. Examples of suitable aliphatic diamines are ethylene diamine, 1,3-propane-diamine, 1,4-diaminobutane, 1,5-pentanediamine, 2-methyl-1,5-pentanediamine, 1,6-hexanediamine, 2,2,4-trimethyl-1,6-hexanediamine, 2,4,4-trimethyl-1,6-hexanediamine, cis-1,4-cyclohexanediamine, trans-1,4-cyclohexanediamine, isophorone diamine, 1,8-octanediamine, 1,9-nonanediamine, 1,10-decanediamine, 1,11-undecanediamine, 1,12-dodecanediamine, 1,13-tridecanediamine, 1,14-tetradecanediamine, 1,15-pentadecanediamine, 1,16-hexadecanediamine, 1,17-heptadecanediamine, 1,18-octadecanediamine, 1,19-nonadecanediamine, and 1,20-eicosanediamine. Examples of aromatic diamines are 1,4-diaminobenzene, 1,3-diaminobenzene, 1,4-naphthalenediamine, 1,5-naphthalenediamine 2,6-naphthalenediamine, meta-xylenediamine and para-xylenediamine.

Preferably, the diamine comprises at least an aliphatic C2-C10 diamine, i.e. an aliphatic diamine with from to 2 up to and including 10 carbon atoms. The advantage thereof is that the salt resulting from the diamine has a higher solubility in water. More preferably, the diamine comprises one or more than one aliphatic C2-C10 diamine in an amount of at least 50 mole %, relative to the total molar amount of diamine. Still more preferably, the amount of aliphatic C2-C10 diamine is at least 75 mole %, relative to the total molar amount of diamine.

Even more preferably, the diamine comprises one or more than one aliphatic C4-C6 diamine in an amount of at least 50 mole %, relative to the total molar amount of diamine. Still more preferably, the amount of aliphatic C4-C6 diamine is at least 75 mole %, relative to the total molar amount of diamine. The advantage thereof is that lower temperatures can be used to flash to a dry salt, and polymerization before flashing is suppressed.

The aliphatic C4-C6 diamine suitably consists of a diamine selected from 1,4-diaminobutane, 1,5-pentanediamine, 2-methyl-1,5-pentanediamine and 1,6-hexanediamine, or any mixture thereof; preferably selected from 1,4-diaminobutane, 1,5-pentanediamine and 1,6-hexanediamine, or any mixture thereof.

Suitably, the dicarboxylic acid is selected from aromatic dicarboxylic acid, or aliphatic dicarboxylic acid, or any combination thereof. Suitable examples of aromatic dicarboxylic acids are terephthalic acid, isophthalic acid, 2,6-naphthalene dicarboxylic acid, 4,4'-diphenyl dicarboxylic acid. For the aliphatic dicarboxylic acids suitable examples are oxalic acid, succinic acid, 1,5-pentanedicarboxylic acid, adipic acid, 1,7-heptanedioic acid, 1,8-octanedioic acid, azaleic acid (1,9-nonanedioc acid), sebacic acid (1,10-decanoic acid), 1,11-undecanoic acid, 1,12-dodecanoic acid, 1,13-tridecanoic acid, 1,14-tetradecanoic acid, 1,15-pentdecanoic acid, 1,16-hexadecanoic acid, 1,17-heptadecanoic acid, 1,18-octadecanoic acid, 1,19-nonadecanoic acid, and 1,20-eicosanedioic acid.

Preferably, the dicarboxylic acid comprises a C4-C10 aliphatic dicarboxylic acid, i.e. an aliphatic dicarboxylic acid with from to 4 up to and including 10 carbon atoms. The advantage thereof is that the salt resulting from the dicarboxylic acid has a higher solubility in water, allowing the use of a higher salt concentration and less water to be evaporated.

Also preferably, the dicarboxylic acid comprises an aromatic dicarboxylic acid. The advantage of this selection is that the temperature conditions applied in the flash drying can be varied over a wider range.

Examples of salts that can be prepared with the process according to the invention include the following semi-aromatic salts: XT, XI, XT/XI, XT/X6, XT/Y6 and XT/YT, and any combinations thereof, wherein T represents terephthalic acid, I represents isophthalic acid, 6 represents adipic acid, and X and Y represent diamines. In a preferred embodiment X and Y are different diamines, independently from each other chosen from aliphatic diamines from the group consisting of ethylene diamine, 1,4-diaminobutane, 1,5-pentanediamine, 2-methyl-1,5-pentanediamine, 1,6-hexanediamine, 2,2,4-trimethyl-1,6-hexanediamine, 2,4,4-trimethyl-1,6-hexanediamine, cis-1,4-cyclohexanediamine, trans-1,4-cyclohexanediamine, 1,8-octanediamine, 1,9-nonanediamine, and 1,10-decanediamine.

Other examples of salts that can be prepared with the process according to the invention include the following aliphatic salts: 46, 66, 46/66, 66/68, and 410, and any combinations thereof.

The salts may also be mixed salts, for example comprising a mixture of components from any of the mentioned semi-aromatic salts XT, XI, XT/XI, XT/X6, XT/YT and XT/YT and any of the aliphatic salts 46, 66, 46/66, 66/68, and 410.

In a preferred embodiment of the invention, the dicarboxylic acid in the salt comprises terephthalic acid, for example in an amount of at least 50 mole %, more particular at least 75 mole %, or even consists of terephthalic acid.

In a more preferred embodiment, the dicarboxylic acid consists for at least 75 mole % of terephthalic acid, and the diamine consists for at least 75 mole % of 1,6-hexamethylediamine (HMDA) and/or 1,4-diaminobutane (DAB) and/or 1,5-pentanediamine.

Preferably the diamine comprises 1,6-hexamethylediamine (HMDA) and 1,4-diaminobutane (DAB) in a molar ratio DAB/HMDA in the range of 25:75-45:55, or even better 30:70-40:60, as this gives rise to a polyamide with eutectic melting point.

Also preferable, the diamine comprises 1,6-hexamethylediamine (HMDA) and 1,5-pentanediamine (PD) in a molar ratio PD/HMDA in the range of 30:70-70:30, or even better 40:60-60:40.

Even more preferred the dicarboxylic acid consists for 95-100 mole % of terephthalic acid, and the diamine consists for at least 95-100 mole % of 1,6-hexamethylediamine (HMDA), 1,4-diaminobutane (DAB) or 1,5-pentanediamine. Suitably, the corresponding polyamides are either homopolymers PA-4T, PA-5T or PA-6T, or copolymers thereof such as PA4T/5T, PA-4T/6T and PA-5T/6T, or PA-4T/5T/6T.

In the process according to the invention, the dicarboxylic acid and the diamine do not need to be present in exact equimolar amounts. Suitably, the dicarboxylic acid and the diamine are present in a molar ratio in the range of 0.95:1-1.05:1, preferably 0.98:1-1.02:1, more preferably 0.99:1-1.01:1.

The invention also relates to a nylon salt. The nylon salt according to the invention is a granular salt material comprising a diammonium dicarboxylate salt obtainable by flash drying.

Suitably, the granular salt material according to the invention has a particle size distribution with a median particle size (d50) in the range of 50-3000 μm, in the range of 200-1000 μm, more preferably 400-750 μm. Herein the particle size distribution is measured with laser granulometry by the method according to ISO 13320-1 at 20° C.

The granular salt material according to the invention has further interesting properties such as high density and low compressibility. The compressibility is determined by comparing the aerated bulk density (ABD) and the tapped bulk density (TBD). Each of the aerated bulk density (ABD) and the tapped bulk density (TPB) are measured by the method according to ASTM D6393. Suitably, the compressibility, expressed by the ratio of (TBD-ABD)/TBD*100%, is at most 25%.

Suitably, the granular salt material has a tapped bulk density in the range of 350-750 kg/m$^3$; preferably the tapped bulk density in the range of 450-700 kg/m$^3$.

The granular salt material obtained by the flash process can be easily pelletized, optionally using a few percent of additional water as binder. The granular salt material, as well as the pelletized product made thereof can be polymerized into a polyamide polymer using any suitable polymerization process. In particular, the salt can polymerized by direct solid state polymerization, by applying a suitable heating profile, in which the temperature remains below the melting temperature of the salt. Preferably, during the direct solid state polymerization, the granular salt material is heated to elevated temperature, and wherein said temperature is kept below the melting temperature of the salt minus 10° C., preferably below the melting temperature of the salt minus 15° C.

With the term melting temperature of the salt is herein understood the temperature, measured by the DSC method according to ISO-11357-1/3, 2011, on pre-dried samples in an N2 atmosphere with heating and cooling rate of 10° C./min. Herein Tm has been calculated from the peak value of the highest melting peak in the first heating cycle. Herein the granulate salt material is dried during 24 hours at 105° C. and under a vacuum of 100 mmHg.

The invention also relates to a process for preparing a nylon polymer. The process comprises direct solid state polymerization (DSSP) of a diammonium dicarboxylate salt (i.e. a nylon salt), wherein the salt is a granular salt material prepared by flash granulation, or a pelletized product made thereof.

The granulate salt material according to the invention may also be used in a process wherein a diammonium dicarboxylate salt is polymerized in a liquid state. Herein the diammonium dicarboxylate salt suitably comprises a granulate salt material prepared by flash granulation and the granulate salt material is either molten or dissolved. For example, a 66 salt prepared by flash granulation can be advantageously used in a conventional melt polymerization process, to produce polyamide-66 or a copolymer thereof. Another example is the polymerization of such a salt in a solution process in an aqueous solution to prepare a prepolymer, followed by isolation of the prepolymer and subsequent solid state post condensation to convert the prepolymer in a polyamide polymer.

The invention is further illustrated with the following examples and comparative experiments.

Methods

Aerated Bulk Density (ABD) and Tapped Bulk Density (TBD)

The ABD and TBD were measured by the method according to ASTM D6393-08 ("Standard Test Method for Bulk Solids Characterization by Carr Indices", ASTM International, West Conshocken, Pa., DOI: 10.1520/D6393-08) with a Hosokawa Powder Tester at 20° C.

Residual Water Content

The residual water content of a salt was determined by drying of the salt during 24 hours at 105° C. and under a vacuum of 100 mmHg, i.e. equal to an absolute pressure of 0.01 bar. The weight of the salt was measured before and after drying. The residual water content was calculated from the weight loss expressed as weight percentage relative to the weight of the granular salt material before drying.

Compositions of Salts and Polymers

The composition of the salt with regard to ratio of diamines was determined by $^1$H-NMR. The ratio of dicarboxylic acid/diamine was calculated form the excess of diamine determined by titration of a salt solution in water. The number of end groups, i.e. residual amine functional groups and residual carboxylic acid functional groups was determined by $^1$H-NMR Preparation of Nylon Salt by Flashing: General Procedure The preparation process was carried out using a 2.5 liter autoclave equipped with a heating mantle, a lid, a stirrer, a nitrogen gas inlet, an inspection glass, a distillation valve and a pressure meter at the top, and a flash valve at the bottom. Below the autoclave, a 10 liter flash chamber was positioned, the flash chamber comprising an opening positioned closely to the flash valve and another opening for gas inlet/outlet. The autoclave was filled with diamine, dicarboxylic acid and water, mixed and inertisized three times with nitrogen of 10 barg. Then the mixture was heated up, with a heating ramp of 2° C./min, upon which the salt components dissolved in the water, resulting in a clear salt solution. During further heating up, the water was distilled at a preset pressure and temperature until a solution or slurry with a certain concentration was reached. Then the reactor was closed by closing the distillation valve and further heated up to a higher temperature. The pressure at that temperature was monitored. The nature of the aqueous mixture was visually inspected, in order to determine whether it was a solution or a slurry. In most of the examples, the mixture inside the reactor showed to be a suspension of fine salt crystals. Prior to flashing of the slurry, the flash chamber was inertisized by leading nitrogen gas through the flash chamber. Where applicable the flash chamber was preheated in an oven set at a predetermined temperature. Then, the total amount of the aqueous mixture was discharged from the autoclave by opening the flash valve and flashed into the inertisized flash chamber. Upon flashing, the water present in the aqueous mixture, or the larger part of it, evaporated immediately and escaped via the gas inlet/outlet. The salt stayed behind in the flash chamber.

Salt Compositions

For the diamine in Comparative Experiments A-C and Examples I-VI, a mixture of 1,4-butanediamine and hexamethylenediamine in a mole ratio of about 40/60 was used. For examples VII and VIII a mixture of 1,5-pentanediamine and hexamethylenediamine in a mole ration of about 40/60 was used, while in example IX pure 1,5-pentanediamine was used. For the dicarboxylic acid, terephthalic acid was used in all cases. For these raw materials, industrial grades were used.

Results

Different experiments were carried out using different salt concentrations and/or different temperature profiles. The observations and results for the different experiments are shown in Tables 1A and 1B below.

Pelletization

For the preparation of pellets, two metal molds were used, each with a cylindrical hole, one with a diameter of 5 mm and a height of 25 mm, the other one with a diameter of 13 mm and a height of 32 mm. The mold was filled with granular salt material. Then the mold was placed in a press equipped with a metal stamp of appropriate diameter. Then the granular salt material was compressed by first lowering the stamp manually and then pressing the stamp with a pressure of 60 kN/cm2.

TABLE 1A

Observations and results for the Comparative Experiments CE-A/C and Examples EX-II, V and VI

| | CE-A | CE-B | CE-C | EX-II | EX-V | EX-VI |
|---|---|---|---|---|---|---|
| Initial concentration (wt. %) | 50 | 65 | 65 | 70 | 70 | 70 |
| Initial temperature (° C.) | 50 | 50 | 50 | 50 | 50 | 50 |
| Visual appearance of mixture | clear | slurry | slurry | slurry | slurry | slurry |
| Temperature of heated solution (° C.) | 170 | 200 | 220 | 180 | 190 | 200 |
| Visual appearance | clear | clear | clear | clear | clear | clear |
| Concentration after evaporation (wt. %) | 60 | 69 | 70 | 82 | 82 | 82 |
| Visual appearance of mixture | Clear | Clear | Clear | Slurry | Slurry | Slurry |
| Further heating step | No | No | No | Yes | No | No |
| Temperature at start of flash step (° C.) | 170 | 200 | 220 | 190 | 190 | 200 |
| Waiting time at flash temperature (min) | 0 | 0 | 15 | 0 | 15 | 15 |
| Pressure (barg) | 5 | 5 | >25 | 7 | 7 | 11.5 |
| Total time Q (minutes) (note (a)) | 60 | 60 | 85 | 60 | 75 | 80 |
| Visual appearance of mixture | clear | clear | clear | slurry | slurry | slurry |
| Temperature of wall flash chamber (° C.) | Rt | 150 | 150 | 150 | 150 | 150 |
| Duration of flash step (seconds) | 10 | 10 | — | 10 | 10 | 1 |
| Appearance product (note (b)) | NG | NG | n.a. (note (d)) | OK | OK | OK |
| Pre-condensation level (%) | | | n.a. (note (d)) | 1.6 | 2.0 | 2.9 |
| Aerated bulk density (g/l) | | | n.a. (note (d)) | 490 | | 490 |
| Tapped bulk density (g/l) | | | n.a. (note (d)) | 590 | | 590 |
| Residual water content (wt. %) | 22 | 11 | n.a. (note (d)) | | 4.5 | |
| Cleanliness reactor (note (c)) | 4 | 3 | n.a. (note (d)) | 5 | 4 | 3 |

TABLE 1B

Observations and results for the Comparative Experiments CE-A/C and Examples EX-II, I, III-IV and VII-IX

| | EX-III | EX-IV | EX-I | EX-VII Note (e) | EX-VIII Note (e) | EX-IX Note (f) |
|---|---|---|---|---|---|---|
| Initial concentration (wt. %) | 70 | 70 | 65 | 65 | 65 | 65 |
| Initial temperature (° C.) | 50 | 50 | 50 | 50 | 50 | 50 |
| Visual appearance of mixture | slurry | slurry | slurry | slurry | Slurry | Slurry |
| Temperature of heated solution (° C.) | 180 | 180 | 215 | 180 | 180 | 180 |
| Visual appearance | clear | clear | clear | Clear | Clear | Clear |
| Concentration after evaporation (wt. %) | 82 | 82 | 70 | 71 | 83 | 70 |
| Visual appearance of mixture | Slurry | Slurry | Clear | Slurry | Slurry | Clear |
| Further heating step | Yes | Yes | No | Yes | Yes | Yes |
| Temperature at start of flash step (° C.) | 200 | 210 | 215 | 215 | 200 | 215 |
| Waiting time at flash temperature (min) | 0 | 0 | 0 | 0 | 0 | 0 |
| Pressure (barg) | 10 | 11 | 15 | 15 | 10 | 15 |
| Total time Q (minutes) (note (a)) | 60 | 65 | 70 | 70 | 60 | 70 |
| Visual appearance of mixture | slurry | slurry | clear | clear | slurry | clear |
| Temperature of wall flash chamber (° C.) | 150 | 150 | 150 | 150 | 150 | 150 |
| Duration of flash step (seconds) | 10 | 1 | 10 | 10 | 10 | 10 |
| Appearance product (note (b)) | OK | OK | OK | OK | OK | OK |
| Pre-condensation level (%) | 2 | 4 | | 3.5 | 2 | 3.6 |
| Aerated bulk density (g/l) | 480 | | | | | |
| Tapped bulk density (g/l) | 590 | | | | | |

TABLE 1B-continued

Observations and results for the Comparative Experiments CE-A/C and Examples EX-II, I, III-IV and VII-IX

|  | EX-III | EX-IV | EX-I | EX-VII Note (e) | EX-VIII Note (e) | EX-IX Note (f) |
|---|---|---|---|---|---|---|
| Residual water content (wt. %) | 3 | 1 | <1 | <1 | 2.5 | <1 |
| Cleanliness reactor (note (c)) | 3 | 3 | 3 | 3 | 3 | 3 |

Notes for Tables 1A and 1B:
(a) Total time from first heated temperature, before, during, after evaporation, plus further heating, until start of flashing
(b) Appearance product NG=not good, Sticky salt lumps, big crystals; MO: moderate; OK=good: surface dry, non-sticky powder; other?
(c) Cleanliness reactor: 1=very bad, very hard to clean; 2=not good, residues of prepolymer, difficult to clean with water; 3=acceptable, some prepolymer left in the reactor, but easy to clean with water; 4=good: residues of salt, but easy to clean with water; 5=excellent: hardly any visible residues or even none;
(d) Experiment was interrupted because of observed pressure increase, significant above the level of 16-17 bars, estimated for the applied temperature and water content
(e) Experiment with a mixture of 1,5-pentanediamine, hexamethylenediamine (40/60 molar ratio) and terephthalic acid
(f) Experiment with 1,5-pentanediamine and terephthalic acid The results for Examples II-IV show that using a higher temperature for the flash step, a product with a lower water content is obtained. The results also show that using a higher temperature for the flash step, a product with a higher degree of pre-condensation is obtained. Comparative experiments CE-A and CE-B show that if the flash step is carried out at a relatively low temperature with a relatively high water content, a non-granular product with a too high residual water content is obtained. Comparative experiments CE-C shows that if the flash step is carried out at a relatively high temperature with a relatively long residence time, a significant pressure increase is observed, which is considered to be indicative for extensive pre-condensation to have occurred. Examples VII and VIII show that very similar results are obtained using the 1,5-pentanediamine, hexamethylenediamine (about 40/60 molar ratio) with terephthalic acid mixtures, while example IX shows that pure 1,5-pentanediamine terephthalate can also be used in this process. The pellets from the Examples according to the invention so produced showed a good integrity and a high strength.

The invention claimed is:

1. A process for preparing a nylon polymer, wherein the process comprises:
   (a) providing a diammonium dicarboxylate salt which is a granular salt material prepared by flash granulation at a temperature Tp of at least 150° C. to 230° C., and
   (b) conducting direct solid state polymerization (DSSP) of the diammonium dicarboxylate salt.

2. The process of claim 1, wherein the granular salt material is a granular nylon salt.

3. The process according to claim 2, wherein the granular nylon salt is prepared by the steps comprising:
   (a) providing in a pressure vessel a concentrated aqueous mixture comprising at least 65 wt. % of salt components and at most 35 wt. % of an aqueous medium, the weight percentages (wt. %) being relative to the total weight of the aqueous mixture;
   (b) controlling temperature of the concentrated aqueous mixture in the pressure vessel so that the concentrated aqueous mixture has the temperature Tp of at least 150° C. to 230° C.;
   (c) controlling pre-condensation eventually occurring in the concentrated aqueous mixture so that pre-condensation therein remains at a level of at most 15 mole %; and
   (d) discharging the concentrated aqueous mixture from the pressure vessel by flashing the concentrated aqueous mixture at the temperature Tp of 150° C. to 230° C. via a flash valve into a flash chamber to evaporate the aqueous medium in an amount sufficient to result in a residual moisture content of at most 7.5 wt. % and thereby directly form forming a granular nylon salt material, wherein the wt. % of the residual moisture content is relative to the weight of the granular nylon salt material.

4. The process according to claim 3, wherein the concentrated aqueous mixture is:
   (i) an aqueous solution comprising a diamine, or a mixture of at least two diamines, and a dicarboxylic acid, or a mixture of at least two dicarboxylic acids, all together referred to as salt precursors, dissolved in the aqueous medium; or
   (ii) an aqueous slurry comprising a diammonium dicarboxylate salt dispersed in the aqueous medium.

5. The process according to claim 3, wherein the concentrated aqueous mixture is an aqueous solution prepared by:
   dissolving salt precursors in an aqueous medium, using an excess of the aqueous medium, thereby obtaining a diluted solution; and
   evaporating the excess of the aqueous medium at elevated temperature and elevated pressure, thereby obtaining a pressurized concentrated solution.

6. The process according to claim 3, wherein the concentrated aqueous mixture is an aqueous solution prepared by:
   providing a slurry comprising salt components dispersed in an aqueous medium in a pressure vessel; and
   closing the pressure vessel and heating the slurry in the pressure vessel to elevated temperature thereby increasing the pressure in the pressure vessel, dissolving the salt components and obtaining a pressurized concentrated solution.

7. The process according to claim 3, wherein the concentrated aqueous mixture is a concentrated aqueous slurry directly obtained from an aqueous solution comprising salt precursors dissolved in the aqueous medium.

8. The process according to claim 7, wherein the concentrated aqueous slurry is prepared by:
   preparing an aqueous solution by dissolving salt precursors in an aqueous medium; and concentrating the aqueous solution by evaporating the aqueous medium in an amount sufficient to result in partial precipitation of diammonium/dicarboxylate salt, thereby obtaining the concentrated aqueous slurry comprising salt particles dispersed in the aqueous medium.

9. The process according to claim 3, wherein step (d) is practiced by flashing the concentrated aqueous mixture such that the aqueous medium is evaporated in an amount sufficient to result in a residual moisture content of at most 5.0 wt. %, relative to the weight of the granular nylon salt material.

10. The process according to claim 3, wherein the aqueous medium consists of water.

11. The process according to claim 3, wherein the aqueous medium is present in an amount of at most 20 wt. %, relative to the total weight of the aqueous mixture, and wherein the temperature Tp is in a range from 150° C. to 170° C.

12. The process according to claim 3, wherein the aqueous medium is present in an amount of at most 25 wt. %, relative to the total weight of the aqueous mixture, and wherein the temperature while Tp is in a range from 170° C. to 190° C.

13. The process according to claim 3, wherein the aqueous medium is present in an amount of at most 30 wt. %, relative to the total weight of the aqueous mixture, and wherein the temperature while Tp is in a range from 190° C. to 210° C.

14. The process according to claim 3, wherein the aqueous medium is present in an amount of at most 35 wt. %, relative to the total weight of the aqueous mixture, and wherein the temperature while Tp is in a range from 210° C. to 230° C.

15. The process according to claim 3, wherein the nylon salt is an aliphatic salt, the salt components therein being all aliphatic components, comprising an aliphatic diamine, or a mixture of at least two aliphatic diamines, and an aliphatic dicarboxylic acid, or a mixture of at least two aliphatic dicarboxylic acids, and wherein the aqueous medium is present in an amount of at most 20 wt. %, relative to the total weight of the aqueous mixture, and wherein the temperature Tp is in a the range from 150° C. to 170° C.

16. The process according to claim 3, wherein the nylon salt is a semi-aromatic salt.

17. The process according to claim 16, wherein the semi-aromatic salt comprises terephthalic acid.

18. The process according to claim 1, wherein the granular salt material is in a form of compressed pellets made of the diammonium dicarboxylate salt.

\* \* \* \* \*